(12) United States Patent
Cover, Jr. et al.

(10) Patent No.: US 7,950,113 B2
(45) Date of Patent: May 31, 2011

(54) DEVICE FOR RETAINING SPLITTING FORCES OF A CABLE STOP

(75) Inventors: Park O. Cover, Jr., Windber, PA (US); Thomas C. Kiesling, Johnstown, PA (US); John Ryan, Johnstown, PA (US); Ed Peretin, South Fork, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 892 days.

(21) Appl. No.: 11/973,549

(22) Filed: Oct. 9, 2007

(65) Prior Publication Data

US 2008/0086848 A1    Apr. 17, 2008

Related U.S. Application Data

(60) Provisional application No. 60/829,040, filed on Oct. 11, 2006.

(51) Int. Cl.
*F16G 11/00* (2006.01)
*A44B 5/00* (2006.01)

(52) U.S. Cl. ...................................... 24/114.5

(58) Field of Classification Search .................. None
See application file for complete search history.

(56) References Cited

U.S. PATENT DOCUMENTS

| | | | |
|---|---|---|---|
| 1,218,138 A * | 3/1917 | Wachter | 24/114.5 |
| 3,577,605 A | 5/1971 | Fischer et al. | |
| 3,809,002 A | 5/1974 | Nagy et al. | |
| 4,134,634 A | 1/1979 | Baur et al. | |
| 4,768,820 A | 9/1988 | Barone | |
| 6,241,063 B1 | 6/2001 | Van Ess et al. | |
| 6,357,779 B1 | 3/2002 | Mok et al. | |
| 7,222,873 B2 | 5/2007 | Rodgers | |
| 2007/0210559 A1 | 9/2007 | Yasmine | |

* cited by examiner

Primary Examiner — Jack W. Lavinder
(74) Attorney, Agent, or Firm — Buchanan Ingersoll & Rooney PC

(57) ABSTRACT

A device for retaining splitting forces incurred by a cable stop, tow stop or carriage stop is disclosed that includes a sleeve having a first end, a second end, and a bore extending from the first end to the second end. The bore is sized and configured to retain at least one of the cable stop, tow stop and carriage stop. The sleeve is sized and configured to retain splitting forces transferred from the cable stop, tow stop or carriage stop when the sleeve retains the cable stop, tow stop or carriage stop and is engaged by a cable catch or tow ball.

23 Claims, 9 Drawing Sheets

DEVICE FOR RETAINING SPLITTING FORCES OF A CABLE STOP

CROSS-REFERENCE TO RELATED APPLICATIONS

The present application claims the benefit under 35 U.S.C. §119(e) of pending U.S. Provisional Patent Application Ser. No. 60/829,040 entitled "Intermediate Carriage Stop (ICS)/Intermediate Tow Stop (ITS) for CSTRS Tow Cable" that was filed on Oct. 11, 2006, the entire disclosure of which is incorporated herein by reference.

FIELD OF INVENTION

The present invention relates to stops, such as cable stops, tow stops or carriage stops for cables, ropes, or other elongate bodies comprised of one or more filaments or fibers that are extended or retracted from a device for towing or lifting and, more particularly, relates to a device for retaining the splitting forces of a cable stop, tow stop, or carriage stop when engaged by a cable catch or tow ball.

BACKGROUND OF THE INVENTION

Cables, ropes, and other elongate bodies are often used to tow or lift objects. For example, military helicopters or ships may extend a cable with a sensor attached to an end of the cable into a body of water and tow the sensor in the water for collecting data, such as the location of enemy vessels or mines. Stops, such as tow stops, cable stops or carriage stops, are often used to help prevent an extended cable or rope used to tow a sensor from being extended further out of the helicopter, ship or other vehicle. Of course, other devices use similar stops to prevent a cable or rope from further extending when an object is being towed or held by the rope or cable.

Cable stops, tow stops and carriage stops can include a bulged portion of a cable. One example of such a stop is disclosed in U.S. Pat. No. 3,577,605 to Fischer et al. Cables having such stops may be extended from a device or vehicle to tow a sensor or other object. To stop the extension of the cable, a cable catch, such as, for example, the cable catch disclosed in U.S. Pat. No. 4,768,820 to Barone, or tow ball is often used to directly engage the bulged portion of the cable (i.e. the cable stop) to prevent the cable from extending further out of the device or vehicle. The engagement of this bulged portion with the cable catch or tow ball stops the cable from further extension and permits a vehicle or device attached to the cable to tow the extended cable or hold the extended cable. By engaging the cable stop, the axial load of the cable is transferred to the cable catch or tow ball.

Such cable stops, tow stops or carriage stops typically experience relatively high compressive forces on the stops and transfer relatively high splitting forces to the cable catch or tow ball used to hold them. The tension may be caused from resistance that results from various activities. For example, tension is created when the cable holds an object and is extended into a body of water, towed behind a ship or vehicle, or retracted back to the vehicle.

Cable catches and tow balls are often designed to incur very large loads of force because cable catches or tow balls generally incur both the transferred axial loads and splitting forces when holding the cable stop, tow stop or carriage stop. The cable catches or tow balls required to hold or retain such stops are usually complex structures that are extremely heavy so that the cable catch or tow ball can effectively hold the cable stop. Such cable catches and tow balls are normally very expensive to produce and maintain.

Cable stops, tow stops and carriage stops often unravel or split due to the high compressive forces and relative motion between the stop and the cable catch or tow ball used to hold them. The compressive forces and relative motion cause local wear and can initially break down the stop. Cable movement, particularly twisting, can also cause breakdown of the cable stop, tow stop, or carriage stop and usually causes the stop to unravel or split.

A device is needed that prevents a cable stop, tow stop or carriage stop from breaking down as a result of interacting with cable catches or two balls and does not cause the cable catches or tow balls to be loaded with high splitting forces. Preferably, the device is sized and configured so it can retain cable stops, carriage stops and tow stops and be held by low weight tow balls or cable catches that are less expensive to produce or maintain than the heavy tow balls or cable catches typically required to engage and retain the stops.

SUMMARY OF THE INVENTION

A device for retaining splitting forces incurred by at least one of a cable stop, tow stop and carriage stop is disclosed that includes a sleeve that has a first end, a second end and a bore extending from the first end to the second end. The bore is sized and configured to receive at least one of a cable stop, a tow stop and a carriage stop. The sleeve can be composed of metals, alloys, composites or any combination thereof.

In some embodiments, the bore has a first width adjacent the first end, a second width adjacent the second end and a third width between the first and second widths. The first and second widths are narrower than the third width.

The device may also include a covering that covers at least a portion of the sleeve. Some embodiments of the covering can be composed of composites, epoxies, ceramics, tape or any combination thereof. In one embodiment, the covering can be composed of a para-aramid composite or an S-glass composite.

Some embodiments of the sleeve may have portions that are moveable relative to each other or that are completely separable from each other. For such embodiments, the portions are configured to be connected to each other to form the sleeve. One example of such an embodiment is a sleeve that has a first portion with projections sized and configured to at least partially fit within openings formed in a second portion of the sleeve when the portions are connected to form the sleeve. Another example of such an embodiment is a sleeve that has multiple portions that are moveably connected to each other so each portion can move relative to another portion when placed in an open position but may be connected to form the sleeve when placed in a closed position. Such embodiments of the sleeve can be useful for retrofitting the sleeve to an existing cable stop, tow stop or carriage stop because the sleeve portions can be arranged to receive the stop when in the open position, or separated position, and can form the sleeve and retain the stop when connected to from the sleeve.

A method of offering a device configured for connection to at least one of a tow stop, cable stop or carriage stop is also provided. The method can include providing an embodiment of the sleeve and providing instructions for connecting the sleeve to at least one of a tow stop, cable stop or carriage stop. Of course, the instructions may be written or be an audio or video recording or include a combination of written materials, audio recordings and visual aids. In one embodiment, the instructions may include live or recorded presentations or classes.

In some embodiments of the inventive method, a covering sized and configured to cover at least a portion of the sleeve may also be provided along with instructions for connecting the covering to at least a portion of the sleeve. Additionally, an adhesive for connecting the covering to at least a portion of the sleeve can be provided.

In other embodiments of the inventive method, at least one portion of the sleeve is marked to indicate how the sleeve should be installed or to identify safety or maintenance related information on the sleeve. In some embodiments, the marking can include one or more notches, labels or indicia attached to the sleeve or formed in the sleeve.

A kit for connecting a device to at least one of a tow stop, a cable stop and a carriage stop is also provided. The inventive kit can include a first portion of a sleeve and a second portion of a sleeve sized and configured for attachment to the first portion of the sleeve. In some embodiments, the portions may be disconnected from each other such that the portions are separated from each other. In other embodiments, the portions may be configured to move relative to each other to form an open position that permits the portions to move relative to each other though the portions are still connected to each other, and a closed position that forms the sleeve when the portions are aligned to form the sleeve and subsequently connected or locked in that position. For example, one embodiment of the first and second portions may be hinged portions that can be opened to receive a cable stop, tow stop or carriage stop and then closed to retain the cable stop, tow stop or carriage stop.

Other details, objects, and advantages of the present invention will become apparent as the following description of certain present preferred embodiments thereof and certain present preferred methods of practicing the same proceeds.

BRIEF DESCRIPTION OF THE DRAWINGS

Certain present preferred embodiments of the present invention are illustrated in the accompanying drawings.

DETAILED DESCRIPTION OF THE INVENTION

Figure 1:
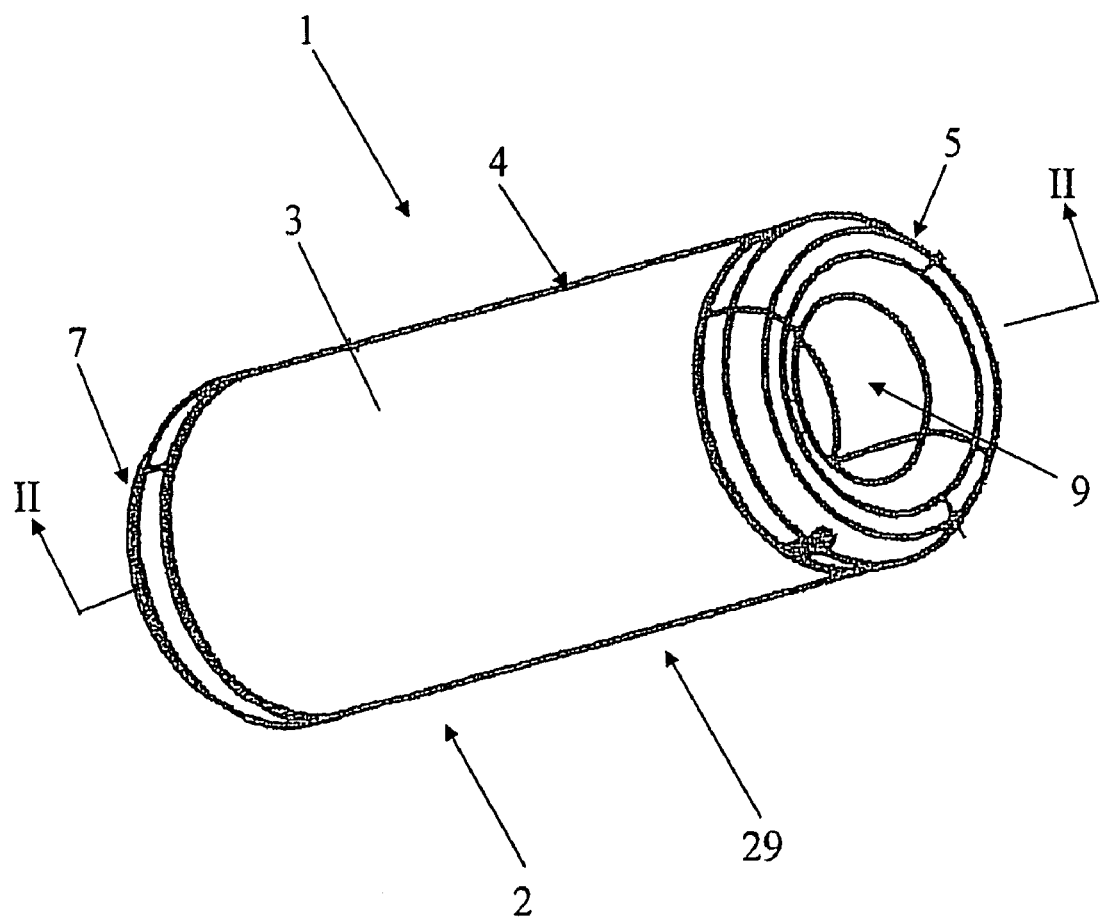
FIG. 1 is a perspective view of a first present preferred embodiment of the inventive device.
Figure 2:
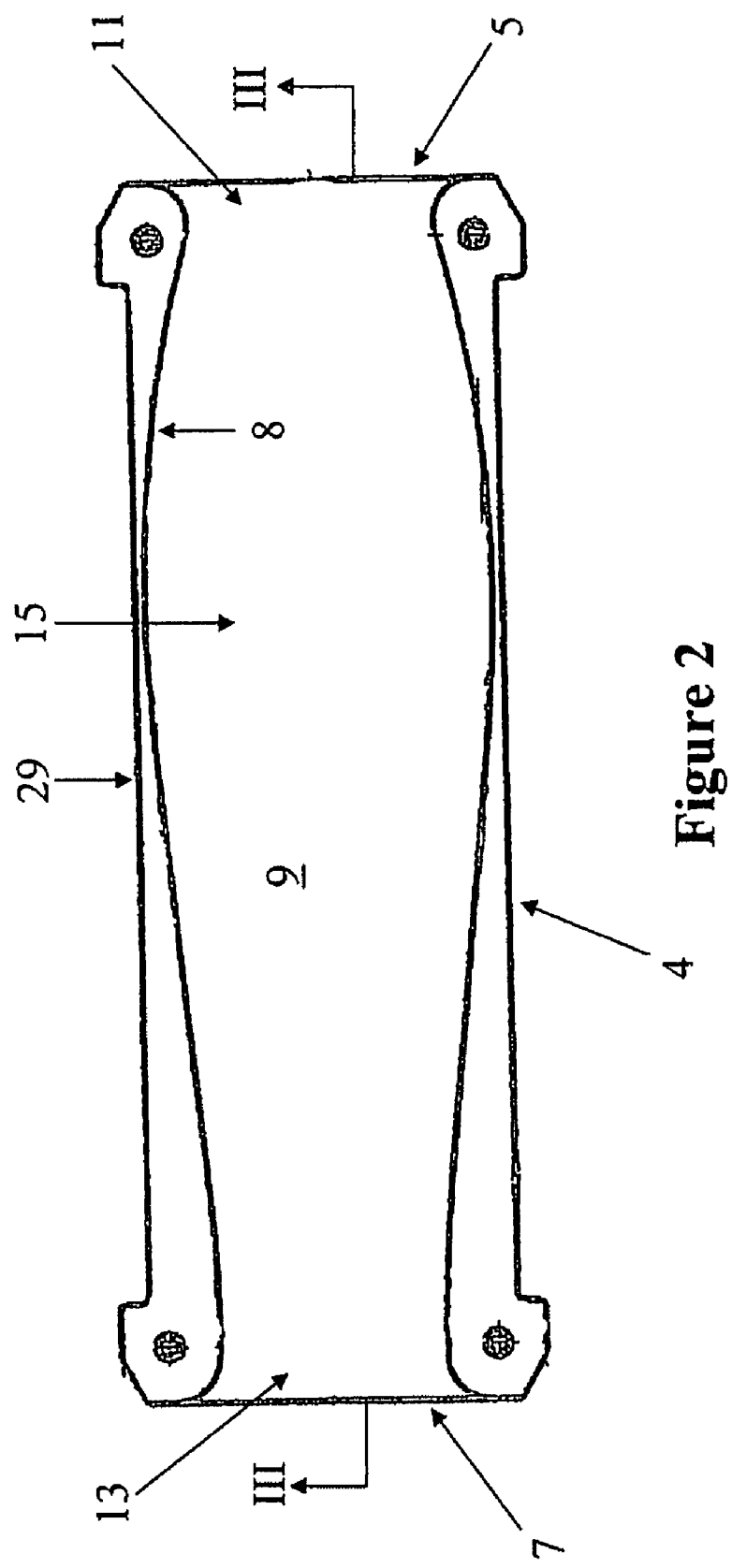
FIG. 2 is a cross sectional view of the first present preferred embodiment taken along line II-II in FIG. 1.

As used herein, the terms cable stop, tow stop and carriage stop can be used interchangeably and use of one term shall be understood to mean any or all of these stops. Similarly, the terms cable catch and tow ball can be used interchangeably and use of one term shall be understood to mean either or both of the devices.

Referring to FIGS. 1-5, a first present preferred embodiment of the inventive device is shown at 1 and includes a sleeve 2 that has a body 3, a first end 5 and a second end 7. The first end 5, second end 7, or both ends may be narrower or wider than the middle portion 29 of the sleeve. The sleeve 2 has an exterior surface 4 and an interior surface 8 that defines a bore 9. The bore 9 extends from the first end 5 to the second end 7 and is sized and configured to receive a cable stop, tow stop, or carriage stop. The sleeve 2 is preferably designed to have a higher breaking strength than the cable or rope of the cable stop, carriage stop or tow stop that the sleeve 2 is sized and configured to retain. Because the stop 1 is configured to retain a cable stop, tow stop or carriage stop, any tow ball, cable catch or other catch directly engages the sleeve 2 and not the retained stop. It should be appreciated the stop retained within bore 9 may be positioned along a middle portion of the cable or rope or adjacent an end of the cable or rope.

The bore 9 may have a first width 11 adjacent the first end 5, a second width 13 adjacent the second end 7 and a third width 15 that is wider than widths 11 and 13. It should be appreciated that when the bore 9 has a circular cross-section (other cross-section geometrics are also contemplated), as shown in FIGS. 1-5, the first 11, second 13, and third 15 widths may be diameters. The third width 15 is located generally between the first 11 and second 13 widths. In some embodiments, the first width 11 and second width 13 may substantially equal. In other embodiments, the first width 11 may be wider or narrower than the second width 13, and vice versa.

Figure 3:
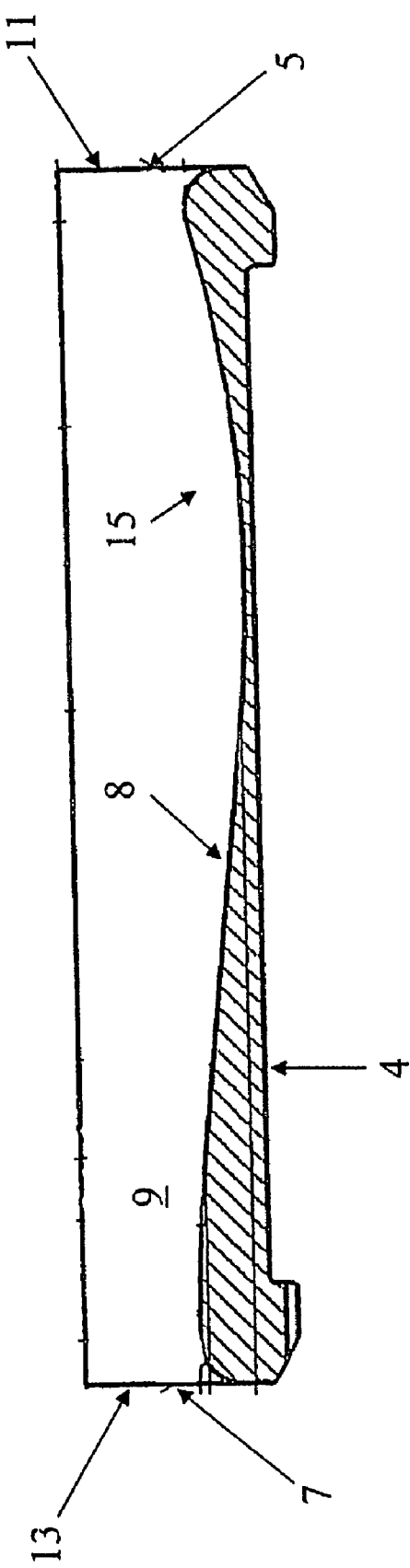
FIG. 3 is a cross sectional view of the first present preferred embodiment taken along line III-III in FIG. 2.

As may best be seen in FIG. 3, the bore 9 can extend from the first end 5 to the second end 7 along a curve and is sized and configured to retain at least one of a cable stop, carriage stop or tow stop. Preferably, the interior surface 8 of the sleeve 2 that defines the periphery of the bore 9 is smooth. It is contemplated, however, that the interior surface 8 could also be a rough surface. It should be appreciated that some embodiments of the stop may have a sleeve 2 with an interior surface 8 that forms a polygonal or other shaped bore 9.

Figure 4:
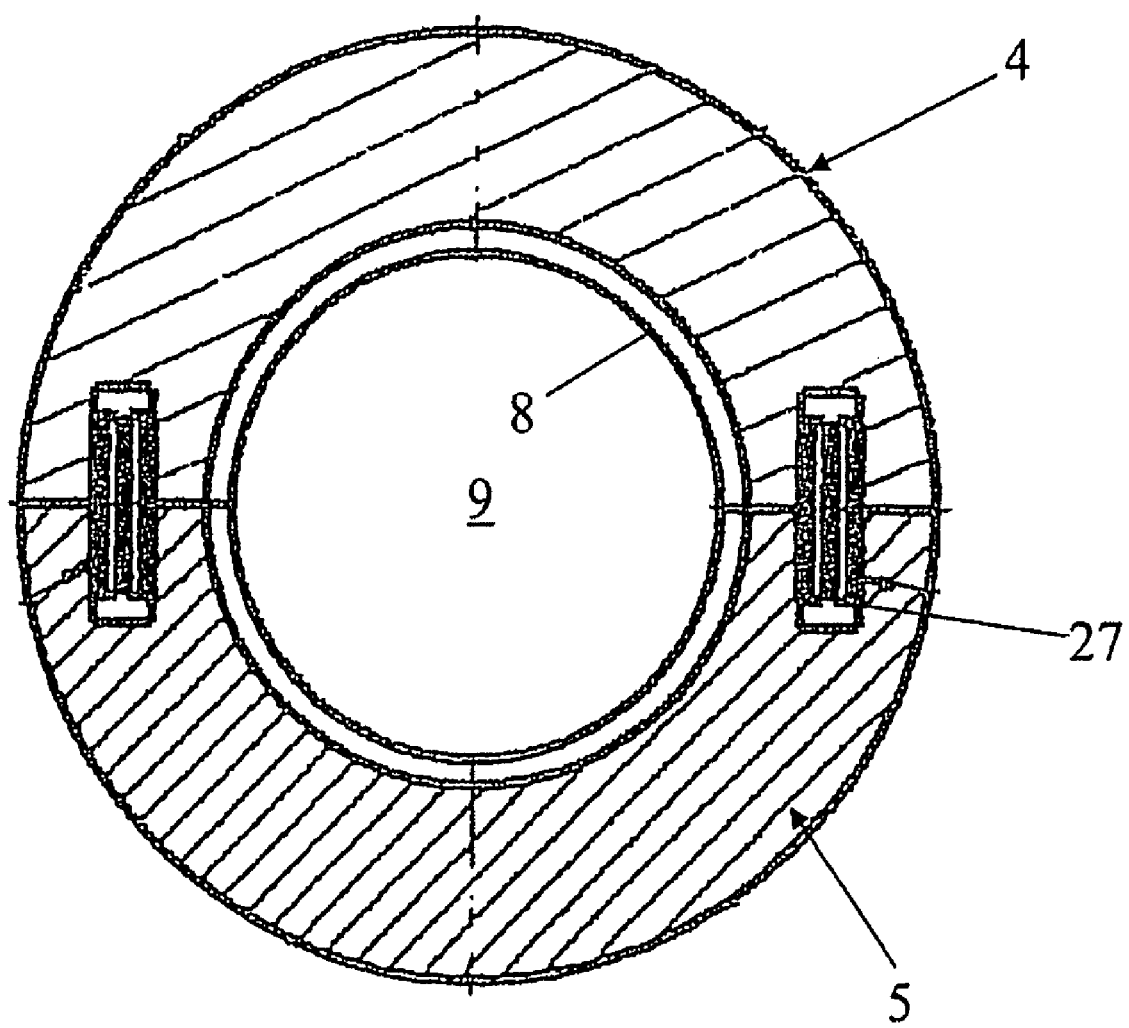
FIG. 4 is a front view of an end of the first present preferred embodiment.
Figure 5:
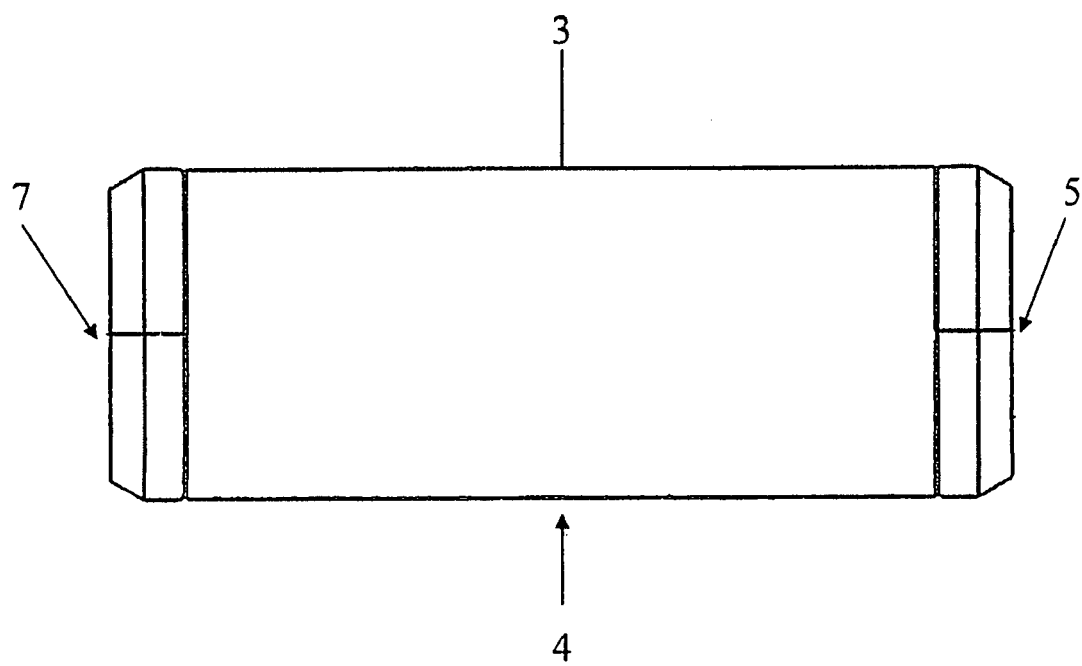
FIG. 5 is a side view of the first present preferred embodiment.

The first end 5 of the sleeve 2 may be marked with one or more markings 27, as shown in FIG. 4. Preferably, the one or more markings 27 are caused by stamping, notching or labeling one or more portions of the end 5. Of course, other marking methods known to those skilled in the art can also be used to make or form markings 27. The markings 27 are configured to indicate when the sleeve 2 has been properly positioned over or connected to a cable stop, carriage stop or tow stop. For example, the markings 27 may be used to indicate which end is a load bearing end for non-symmetrical embodiments. Of course, other embodiments may have one or more markings on the exterior surface 4 of the sleeve 2, interior surface 8 of the sleeve 2 or on any combination thereof. The marking or markings 27 can be formed or attached to the sleeve 2 when the sleeve is being fabricated or after the sleeve 2 is fabricated.

Figure 6:
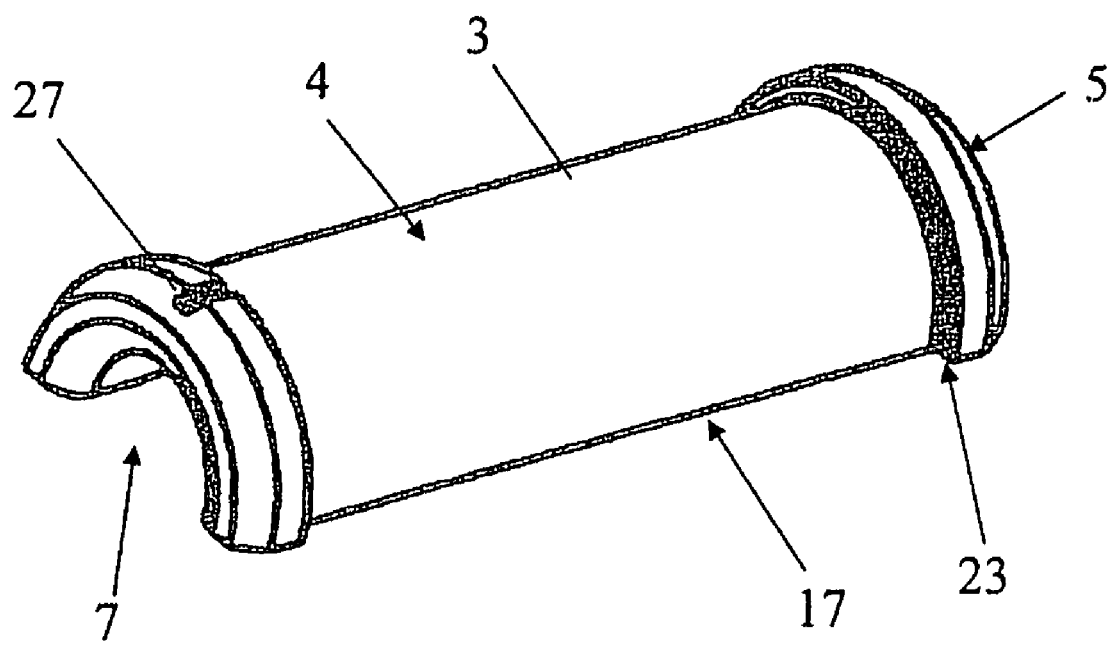
FIG. 6 is a perspective view of a first portion of a second present preferred embodiment of the inventive device.
Figure 7:
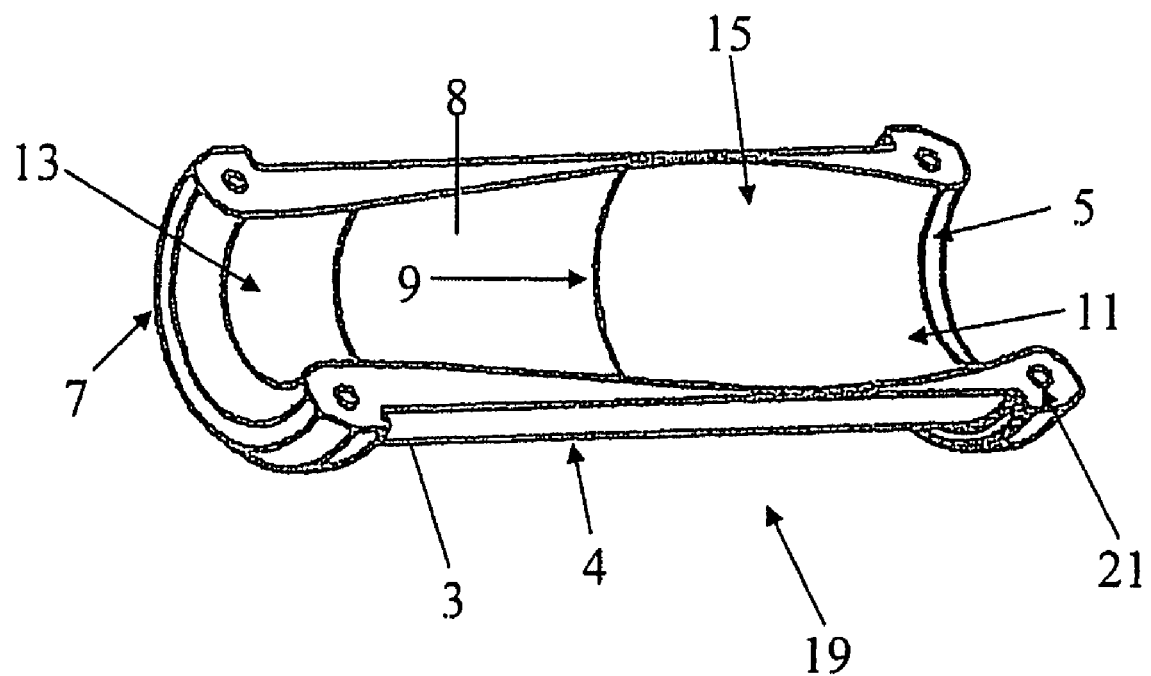
FIG. 7 is a perspective view of a second portion of the second present preferred embodiment that is sized and configured for attachment to the first portion of the second present preferred embodiment.

In some embodiments, the sleeve 2 can include a first portion 17 that is sized and configured to be attached to a second portion 19 to form the sleeve 2, as shown in FIGS. 6-7. The first portion 17 may have pins 23 or other projections that are sized and configured to fit within openings 21 formed in the second portion 19. The first 17 and second 19 portions are configured to define a bore 9 when the portions are connected to each other or aligned with each other to form the sleeve 2.

Figure 9:
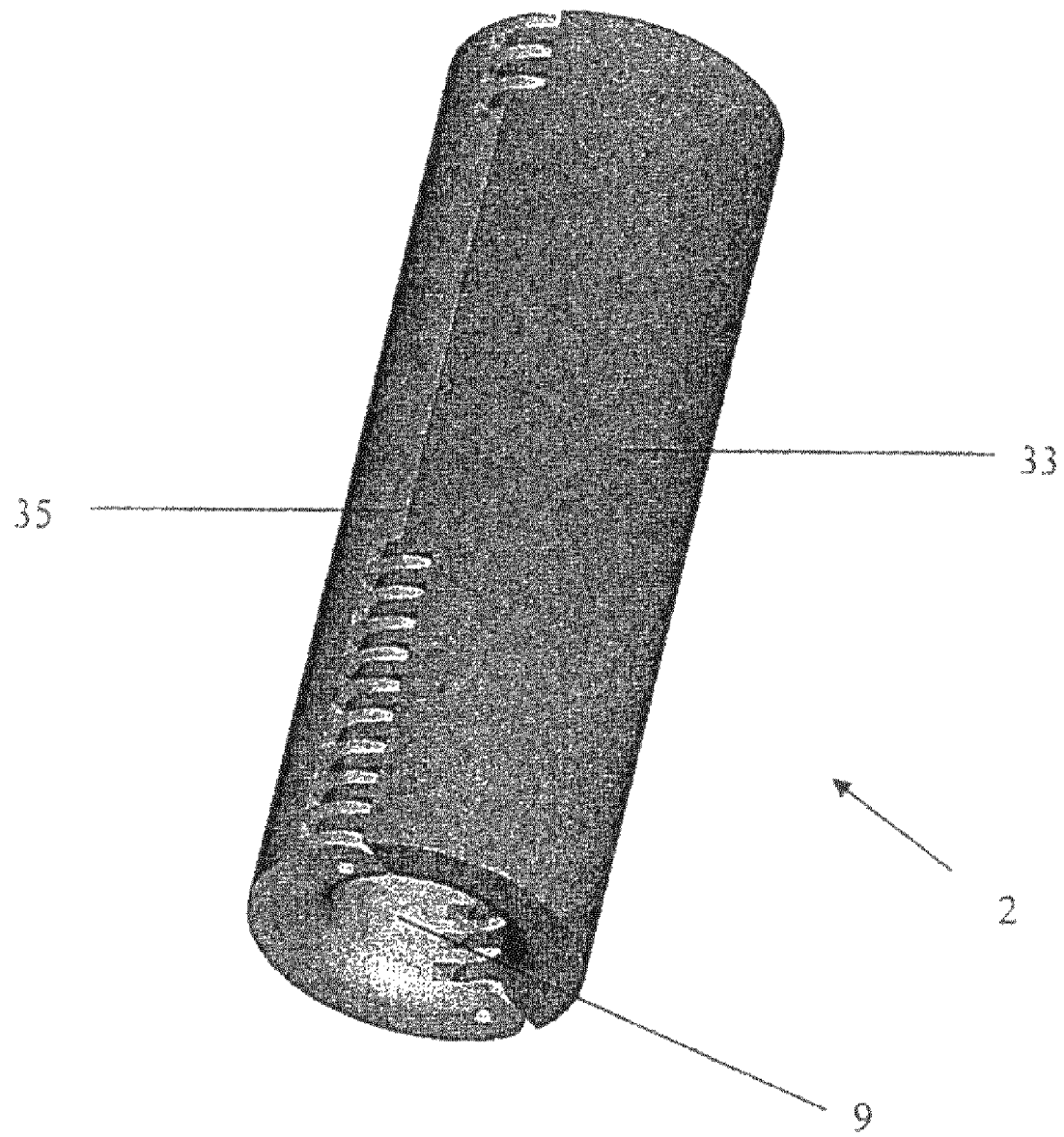
FIG. 9 is a perspective view of a fourth present preferred embodiment of the inventive device.

While FIGS. 6 and 7 illustrate portions 17 and 19 that are halves of a sleeve, it should be understood that other embodiments may include three or more portions sized and configured for connection to each other to form a sleeve 2 with a bore 9. Of course, other embodiments of sleeve 2 may include multiple hinged portions 33 and 35, as shown in FIG. 9, or other connected portions that are moveable relative to one another such that the portions can be moved to an open position for fitting the sleeve 2 on to a stop and subsequently moved or connected into a closed position to have the sleeve 2 retain the stop within the bore 9 of the sleeve 2.

It should be appreciated that the multiple portions 17, 19 or 33, 35 may be connected to each other by fasteners, welding or interlocking mechanisms or attachment mechanisms. In some embodiments, a covering 25 may be used to connect the multiple portions of the sleeve 2 to form the bore 9.

Figure 8:
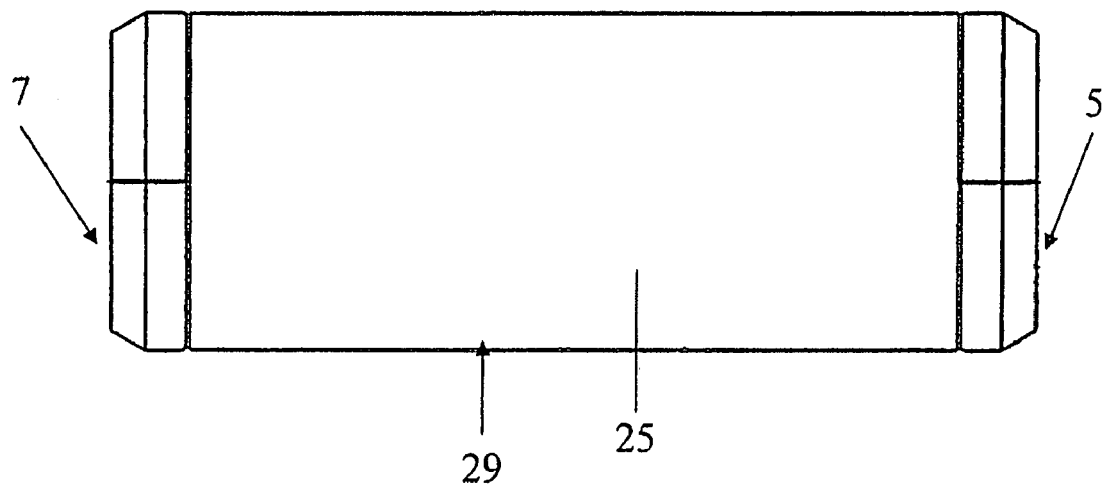
FIG. 8 is a side view of a third present preferred embodiment of the inventive device.

A covering 25 may be positioned adjacent the exterior surface 4 of the sleeve 2, as shown in FIG. 8. The covering 25 may be wrapped about a portion of the sleeve 2 or may be connected to at least a portion of the sleeve 2 by an adhesive or other fastening device. In some embodiments, the covering 25 may be wrapped about a portion of the sleeve 2 prior to or after an adhesive is applied to the covering 25 to ensure that the covering 25 is connected to the sleeve 2. Of course, for embodiments of the covering 25 that include an adhesive component, such as tape or epoxy, a separate adhesive may not be needed to connect the covering 25 to one or more portions of the sleeve 2. The covering 25 may be composed of tape, ceramics, epoxies, composites, adhesives, or any combination thereof. Preferably, the covering 25 is composed of an S-glass composite, or an aramid composite such as para-amid.

It should be appreciated that in embodiments of the sleeve 2 that include two halves connected together or multiple portions connected together, the covering 25 can be used to adhere the multiple portions of the sleeve 2 together to form the sleeve 2. Generally, the apparatus or device used to keep the sleeve 2 configured so that the bore 9 retains the cable stop, tow stop or carriage stop is the determinative factor as to how much of the splitting forces incurred by the retained stop will be retained by the sleeve 2 and not transferred to the cable catch or tow ball. For example, in embodiments where covering 25 connects portions of sleeve 2 together to retain the cable stop, tow stop, or carriage stop, the adhesive properties of the covering 25 can greatly impact the amount of splitting forces the sleeve 2 can retain, if not completely determine the amount of splitting forces retained by the sleeve 2.

Preferably, the covering 25 is positioned over a substantial portion of the exterior surface 4 of the sleeve 2 such that the device 1 can retain the radially acting splitting force load that would otherwise act on the cable catch or tow ball. The covering 25 may cover a substantial portion of the sleeve 2 when it is wrapped about the middle portion 29 of the sleeve 2 so that the covering 25 covers the middle portion 29 of the sleeve 2 between ends 5 and 7 of the sleeve 2 to significantly reduce the splitting forces incurred by a cable catch or tow ball used to interface with the device 1. In other embodiments, the covering 25 may cover the entire sleeve 2, a significant part of the middle portion 29 of the sleeve 2, or one or more portions of the sleeve 2 to cover a substantial portion of the sleeve 2.

It should be appreciated that when the sleeve 2 retains the cable stop, carriage stop or tow stop, the sleeve 2 transfers the axial cable load from the stop to a cable catch, tow ball or other conventional catch. The axial load transfer may also cause large radial loads that can be transferred to the covering 25. Such load transfers to the sleeve 2 and not directly to the cable catch or tow ball, which prevents wear and breakdown of the cable stop, carriage stop or tow stop and increases the ultimate load the cable stop, carriage stop or tow stop can incur without breaking, splitting or unwinding.

Generally, as the covering 25 thickness increases, the ultimate splitting force the sleeve 2 and the cable stop, tow stop or carriage stop retained within the sleeve 2 can incur also increases. Of course, depending on the configuration or design of the sleeve 2, there may be some thickness level that provides no additional increase to the ultimate splitting force of the sleeve 2. Such a thickness level generally depends upon at least the design or configuration of the sleeve 2 and the composition of the sleeve 2 and covering 25.

It has been determined through experimentation that the use of a covering 25 composed of a unidirectional para-amid that provides at least an additional 0.040 inches of outer diameter thickness to one embodiment of the exterior surface 4 can significantly increase the ultimate splitting force of the cable stop, tow stop or carriage stop retained within the bore 9 of the sleeve 2. In one test, an embodiment of the device 1 that had a sleeve 2 and a covering 25 composed of an unidirectional para-amid, or poly para-phenyleneterephthalamide which is commercially available from E. I. du Pont de Nemours and Company under the Kevlar® trade name, was wrapped about and adhered to the middle portion 29 of the sleeve 2 to provide an additional 0.079 inches of thickness to the outer diameter of the middle portion 29 of the sleeve to significantly increase the ultimate splitting force of a cable stop, carriage stop or tow stop. In another test, an embodiment of the present invention had a covering 25 composed of an unidirectional para-amid wrapped about and adhered to the middle portion 29 of the sleeve 2 to provide an additional 0.051 inches to the outer diameter of the middle portion 29 of the sleeve 2 to significantly increase the ultimate splitting force of the cable stop, carriage stop or tow stop. Of course, the amount of covering needed to significantly increase the ultimate splitting force load of the cable stop, two stop, or carriage stop may change depending upon the design and configuration of the sleeve 2 or covering 25.

Without a sleeve 2 with covering 25, a carriage stop is typically damaged beyond repair after three full twists of the cable. When a sleeve 2 with covering 25 is used, the carriage stop in the cable is able to incur more than three full twists.

Additionally, by placing sleeve 2 with covering 25 on a tow stop, cable stop, or carriage stop, the splitting forces transferred from the stop to the cable catch or tow ball can be substantially reduced. In some embodiments, the sleeve 2 may retain all of the splitting forces such that no splitting forces are transferred to a cable catch or tow ball, which results in a 100% reduction in splitting force loads incurred by the cable catch or tow ball. Of course, lower percentage reductions are also contemplated.

As a result of using sleeve 2 with covering 25, the tow ball or cable catch may only incur the axial force component of the load from the cable stop, tow stop or carriage stop retained within the sleeve 2. Consequently, lighter weight and less costly cable catches or tow balls may be used to hold such stops. Moreover, conventional cable catches or tow balls can require less maintenance and upkeep when interfacing with sleeve 2 due to the reduced loads they incur.

In one experiment, a cable catch using a conventional carriage stop required a cable catch weighing approximately 21.8 pounds and costing approximately $50,000. When retrofitting the conventional carriage stop with the inventive device 1 having a sleeve 2 and covering 25, a cable catch weighing 11.6 pounds and costing approximately $13,000 could be used to hold the cable stop and replace the conventional cable catch. Use of device 1 was found to permit about a 47% reduction in cable catch weight and reduce the cost of such a cable catch by 74% due to the reduced weight and less complex components needed for such a light weight cable catch. The device 1 also permitted less wear to be experienced by the cable stop, which further increased the durability of the retained cable stop and improved the costs and time and work associated with maintaining the cable stop and the cable catch.

Due to the significant advantages provided by the containment of splitting force loads and improved cable stop, tow stop or carriage stop performance provided by the inventive device 1, it can be advantageous to position such devices on current cable stops, tow stops or carriage stops for use with tow balls, cable catches, or other catches. To retrofit such existing systems, it is often necessary to provide or offer sleeves 2 and provide or offer instructions for connecting the sleeve 2 to at least one of a tow stop, cable stop or carriage stop. It should be appreciated that embodiments of the device 1 and instructions for installation of the device 1 may be provided by offering the device 1 and instructions to a potential customer.

For some embodiments of the sleeve 2 that includes multiple portions connected to each other to form the sleeve 2, the instructions can teach an installation or maintenance worker to connect or close the sleeve portions about the existing cable stop, tow stop or carriage stop to form the sleeve 2 so that the sleeve 2 retains the enclosed stop. Next, a covering 25 may be attached to at least a portion of the formed sleeve 2 by at least one of wrapping the covering about at least a portion of the exterior surface 4 of the sleeve 2 and adhering the covering 25 to at least a portion of the sleeve 2.

For embodiments of the sleeve 2 that are configured to have a particular end be the load bearing end of the sleeve 2, such an end is preferably marked and the instructions preferably teach an installer that the correctly installed sleeve 2 has the marking facing the appropriate direction. For example, if the sleeve 2 has a load bearing end that has a marking 27, the instructions may explain to have the marking 27 face the direction in which the cable or rope used to tow or lift an object will be expelled from a device to ensure the installation of the device 1 was correctly performed.

The instructions may include one or more written documents or audio or video recordings. The instructions can also include any combination of such information. For example, some embodiments may include instructions that are provided in writing and also communicated by video or by live presentations such as a class or instruction seminar to installation or maintenance workers.

Embodiments of the device 1 may be sold as a kit. Such a kit may include multiple portions of a sleeve 2 that are configured for attachment to each other to form the sleeve 2 that defines a bore 9 sized and configured to retain a cable stop, tow stop or carriage stop. The kit can also include a covering 25 that can be attached to at least a portion of the sleeve 2. In some embodiments, the kit may also include an adhesive to apply to the covering 25, the exterior surface 4 of the sleeve 2, or both to adhere the covering 25 to the sleeve 2. The kit may include all of the components in one package or separate packages each containing one or more components of the kit.

While certain present preferred embodiments of the present invention and certain present preferred methods of making and using the same have been shown and described, it is to be distinctly understood that the invention is not limited thereto but may be otherwise variously embodied and practiced within the scope of the following claims.

We claim:

1. A device for retaining splitting forces incurred by at least one of a cable stop, tow stop and carriage stop comprising:
    a cylindrical shaped sleeve having a first end, a second end, and a bore extending from the first end to the second end, the bore sized and configured to retain the at least one cable stop, tow stop and carriage stop, wherein the first and second ends each have a flat face;
    wherein the cylindrical shaped sleeve comprises first and second semi-cylindrical shaped halves adapted to receive and retain the at least one cable stop, tow stop and carriage stop; and
    a cover comprised of a composite material wrapped around at least a portion of the cylindrical shaped sleeve to secure the first and second semi-cylindrical shaped halves together and retain the at leave one cable stop, tow stop and carriage stop therein;
    wherein the cylindrical shaped sleeve is sized and configured to retain splitting forces transferred from the at least one cable stop, tow stop and carriage stop when the cylindrical shaped sleeve retains the at least one cable stop, tow stop and carriage stop and is engaged by a cable catch or tow ball.

2. The device of claim 1 wherein the bore has a first width adjacent the first end, a second width adjacent the second end, and a third width located between the first width and the second width, the first width and the second width being narrower than the third width.

3. The device of claim 1 wherein the cylindrical shaped sleeve is comprised of at least one material selected from the group consisting of metals, alloys and composites.

4. The device of claim 1 wherein the cover is further comprised of at least one material selected from the group consisting of composites, epoxies, ceramics and tape.

5. The device of claim 1 wherein the bore extends from the first end to the second end along a curve defining a periphery of the bore.

6. The device of claim 1 wherein the first semi-cylindrical shaped half has at least one opening and the second semi-cylindrical shaped half has at least one projection sized and configured to fit within the at least one opening of the first semi-cylindrical shaped half such that when the first semi-cylindrical shaped half is connected to the second semi-cylindrical shaped half, the at least one projection is at least partially within the at least one opening.

7. The device of claim 1 wherein the first width is substantially equal to the second width.

8. The device of claim 1 wherein the cylindrical shaped sleeve is further comprised of a smooth interior surface that defines a periphery of the bore.

9. The device of claim 1 further comprising an adhesive configured to fasten the cover to the at least a portion of the cylindrical shaped sleeve.

10. A method of providing a device sized and configured for connection to at least one of a cable stop, a tow stop and a carriage stop to contain splitting forces incurred by the at least one cable stop, tow stop and carriage stop comprising:
    providing a cylindrical shaped sleeve having a first end, a second end, and a bore extending from the first end to the second end, the bore sized and configured to retain that at least one cable stop, tow stop and carriage stop, wherein the first and second ends each have a flat face, wherein the cylindrical shaped sleeve comprises first and second semi-cylindrical shaped halves adapted to receive and retain the at least one cable stop, tow stop and carriage stop, wherein the cylindrical shaped sleeve is sized and configured to retain splitting forces transferred from the at least one cable stop, tow stop and carriage stop when the cylindrical shaped sleeve retains the at least one cable stop, tow stop and carriage stop and is engaged by a cable catch or tow ball;

providing a cover comprised of a composite material wrapped around at least a portion of the cylindrical shaped sleeve to secure the first and second semi-cylindrical shaped halves together and retain the at leave one cable stop, tow stop and carriage stop therein; and providing instructions for connecting the cylindrical shaped sleeve to the at least one cable stop, tow stop, and carriage stop.

11. The method of claim 10 wherein the bore of the cylindrical shaped sleeve extends from the first end to the second end along a curve defining a periphery of the bore.

12. The method of claim 10 further comprising providing an adhesive for connecting the cover to the at least a portion of the cylindrical shaped sleeve.

13. The method of claim 10 further comprising marking at least a portion of the cylindrical shaped sleeve at one of the first and second ends for proper positioning of the cylindrical shaped sleeve.

14. The method of claim 10 wherein the bore has a first width adjacent the first end, a second width adjacent the second end and a third with between the first width and the second width, the first width and second width being narrower than the third width.

15. The method of claim 10 wherein the cylindrical shaped sleeve is comprised of at least one material selected from the group consisting of metals, alloys and composites.

16. The method of claim 10 wherein the cover is further comprised of at least one material selected from the group consisting of composites, epoxies, ceramics and tape.

17. A kit for connecting a device to at least one of a cable stop, a tow stop and a carriage stop, the device configured to retain splitting forces incurred by the at least one cable stop, tow stop and carriage stop comprising:

a first semi-cylindrical shaped portion of a sleeve;

a second semi-cylindrical shaped portion of a sleeve sized and configured for attachment to the first semi-cylindrical shaped portion of the sleeve so that the first semi-cylindrical shaped portion of the sleeve and the second semi-cylindrical shaped portion of the sleeve form a cylindrical shaped sleeve that has a first end and a second end when the first semi-cylindrical shaped portion of the sleeve and second semi-cylindrical shaped portion of the sleeve are attached to each other, wherein the first and second ends each have a flat face; and a cover comprised of a composite material wrapped around at least a portion of the cylindrical shaped sleeve to secure the first and second semi-cylindrical shaped portions together and retain the at least one cable stop, tow stop and carriage stop therein, wherein the first semi-cylindrical shaped portion of the cylindrical shaped sleeve and the second semi-cylindrical shaped portion of the cylindrical shaped sleeve are sized and configured to define a bore when the first and second semi-cylindrical shaped portions are connected to each other, the bore sized and configured to retain the at least one cable stop, tow stop and carriage stop, the cylindrical shaped sleeve sized and configured to retain splitting forces transferred from the at least one cable stop, tow stop and carriage stop when the cylindrical shaped sleeve retains the at least one cable stop, tow stop and carriage stop and is engaged by a cable catch or tow ball.

18. The kit of claim 17 wherein the first semi-cylindrical shaped portion of the cylindrical shaped sleeve is a first semi-cylindrical shaped half of the cylindrical shaped sleeve and the second semi-cylindrical shaped portion of the cylindrical shaped sleeve is a second semi-cylindrical shaped half of the cylindrical shaped sleeve.

19. The kit of claim 17 wherein the first semi-cylindrical shaped portion has at least one opening and the second semi-cylindrical shaped portion has at least one projection sized and configured to fit within the at least one opening of the first semi-cylindrical shaped portion with the first and second semi-cylindrical shaped portions connected together.

20. The kit of claim 17 further comprising an adhesive configured to fasten the cover to the at least a portion of the cylindrical shaped sleeve.

21. The kit of claim 17 wherein the bore has a first width adjacent the first end, a second width adjacent the second end, and a third width located between the first width and the second width, the first width and the second width being narrower than the third width.

22. The kit of claim 17 wherein the cylindrical shaped sleeve is comprised of at least one material selected from the group consisting of metals, alloys and composites.

23. The kit of claim 17 wherein the cover is further comprised of at least one material selected from the group consisting of composites, epoxies, ceramics and tape.

* * * * *

UNITED STATES PATENT AND TRADEMARK OFFICE
CERTIFICATE OF CORRECTION

PATENT NO.        : 7,950,113 B2
APPLICATION NO.   : 11/973549
DATED             : May 31, 2011
INVENTOR(S)       : Park O. Cover, Jr. et al.

Page 1 of 1

It is certified that error appears in the above-identified patent and that said Letters Patent is hereby corrected as shown below:

At claim 10, column 8, line 60, change "that" to --the--.

At claim 10, column 9, line 8, change "leave" to --least--.

Signed and Sealed this
Nineteenth Day of July, 2011

David J. Kappos
*Director of the United States Patent and Trademark Office*